United States Patent
Chang

(10) Patent No.: US 7,864,069 B2
(45) Date of Patent: Jan. 4, 2011

(54) METHOD FOR DISPLAYING STARTING PROCESS OF ELECTRONIC DEVICE

(75) Inventor: Yao-Shuo Chang, Hsinchu (TW)

(73) Assignee: Foxlink Image Technology Co., Ltd., Hsinchu (TW)

(*) Notice: Subject to any disclaimer, the term of this patent is extended or adjusted under 35 U.S.C. 154(b) by 305 days.

(21) Appl. No.: 12/242,132

(22) Filed: Sep. 30, 2008

(65) Prior Publication Data

US 2010/0079272 A1  Apr. 1, 2010

(51) Int. Cl.
G08B 5/00 (2006.01)
(52) U.S. Cl. .............. 340/815.4; 340/691.6; 713/2
(58) Field of Classification Search .............. 340/815.4, 340/815.42, 815.43, 815.46, 815.53, 332, 340/657, 691.1, 694.6, 692; 714/38; 713/1, 713/2, 100; 345/213, 214
See application file for complete search history.

(56) References Cited

U.S. PATENT DOCUMENTS 5,758,155 A * 5/1998 Circenis .................. 713/2
2006/0107031 A1* 5/2006 Kouno et al. ............. 713/2

* cited by examiner

Primary Examiner—Toan N Pham
(74) Attorney, Agent, or Firm—Muncy, Geissler, Olds & Lowe, PLLC

(57) ABSTRACT

A method for displaying a starting process of an electronic device is described hereinafter. Firstly, divide the starting process of the electronic device into a plurality of starting stages. Next, set a displaying data for each of the starting stages respectively. Lastly, transmit the corresponding displaying data to a displaying device and display the displaying data on the displaying device after executing each of the starting stages. Therefore, the method can make the starting process of the electronic device more intuitionistic. Furthermore, when the electronic device fails in the starting process thereof, the reason for the failure is easy to be preliminarily ascertained by viewing the displaying data displayed on the displaying device so as to provide a helpful reference to the trouble clearing.

5 Claims, 3 Drawing Sheets

METHOD FOR DISPLAYING STARTING PROCESS OF ELECTRONIC DEVICE

BACKGROUND OF THE INVENTION

1. Field of the Invention

The present invention relates to a displaying method, and more particularly to a method for displaying a starting process of an electronic device.

2. The Related Art

With the development of electronic technology, various electronic devices have been widely used in our daily life and living. When the electronic device is started to work, the electronic device needs to spend a period of time on a starting process thereof. However, the starting process is usually indicated on a screen in a sequential percentage so that the starting process is difficult to be viewed in detail. Furthermore, when the electronic device fails in the starting process thereof, the reason for the failure is difficult to be found because of the starting process displayed sightlessly. Therefore, a method for displaying the starting process of the electronic device capable of making the starting process more intuitionistic and easily finding the reason for the failure is required.

SUMMARY OF THE INVENTION

An object of the present invention is to provide a method for displaying a starting process of an electronic device. The method is described hereinafter. Firstly, divide the starting process of the electronic device into a plurality of starting stages. Next, set a displaying data for each of the starting stages respectively. Lastly, transmit the corresponding displaying data to a displaying device and thus display the displaying data on the displaying device after executing each of the starting stages.

As described above, the above-mentioned method can make the starting process of the electronic device more intuitionistic by way of dividing the starting process into the starting stages and displaying the displaying data corresponding to each of the starting stages on the displaying device. Furthermore, when the electronic device fails in the starting process thereof, the reason for the failure is easy to be preliminarily ascertained by viewing the displaying data displayed on the displaying device so as to provide a helpful reference to the trouble clearing.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
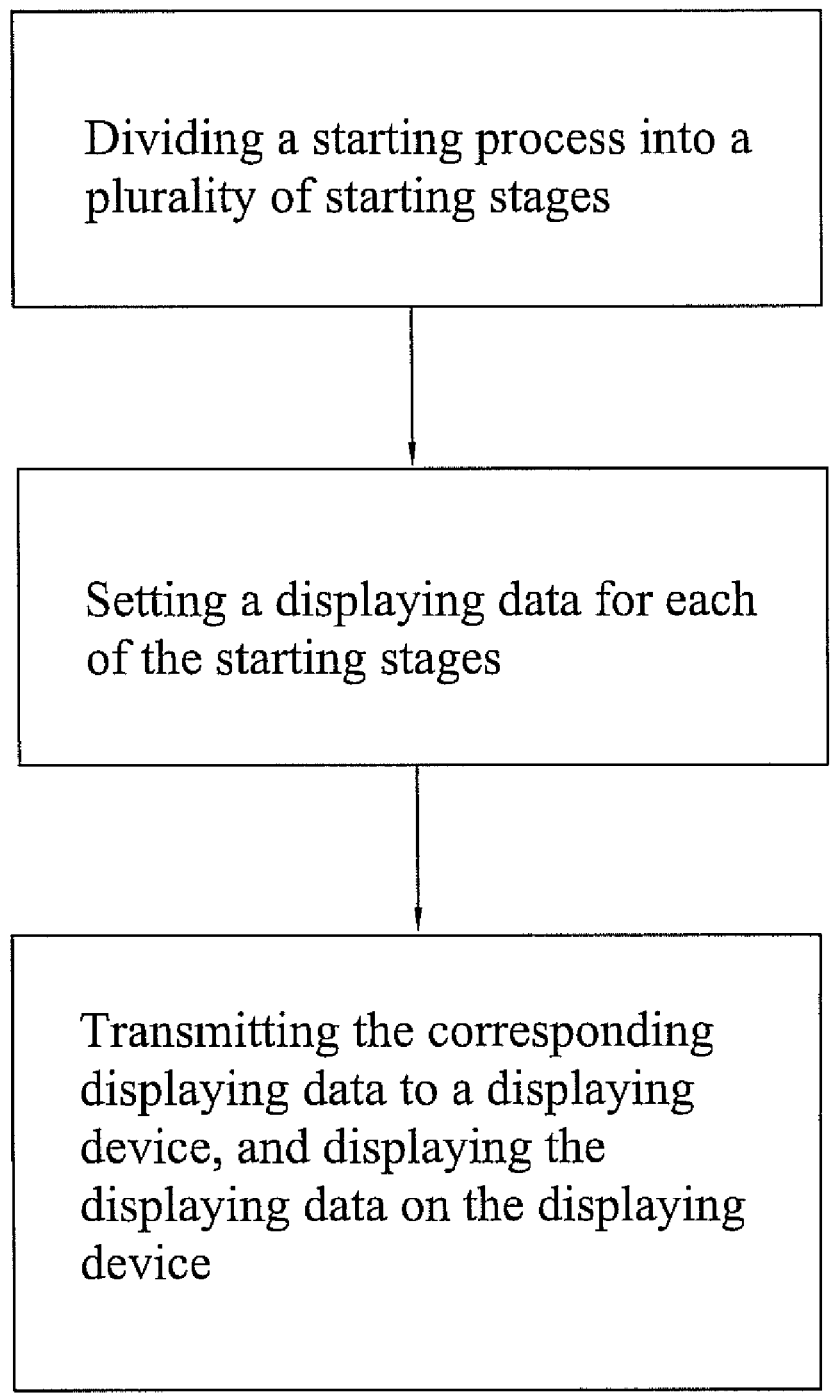
FIG. 1 is a block diagram showing a method for displaying a starting process of an electronic device in accordance with the present invention.

Referring to FIG. 1, a method for displaying a starting process of an electronic device is described hereinafter. Firstly, the starting process of the electronic device is divided into a plurality of starting stages. Next, a set of displaying data for each of the starting stages is set respectively. Lastly, after executing each of the starting stages, the corresponding set of displaying data is transmitted to a displaying device and then the displaying data is displayed on the displaying device as a result of transmission.

Figure 2:
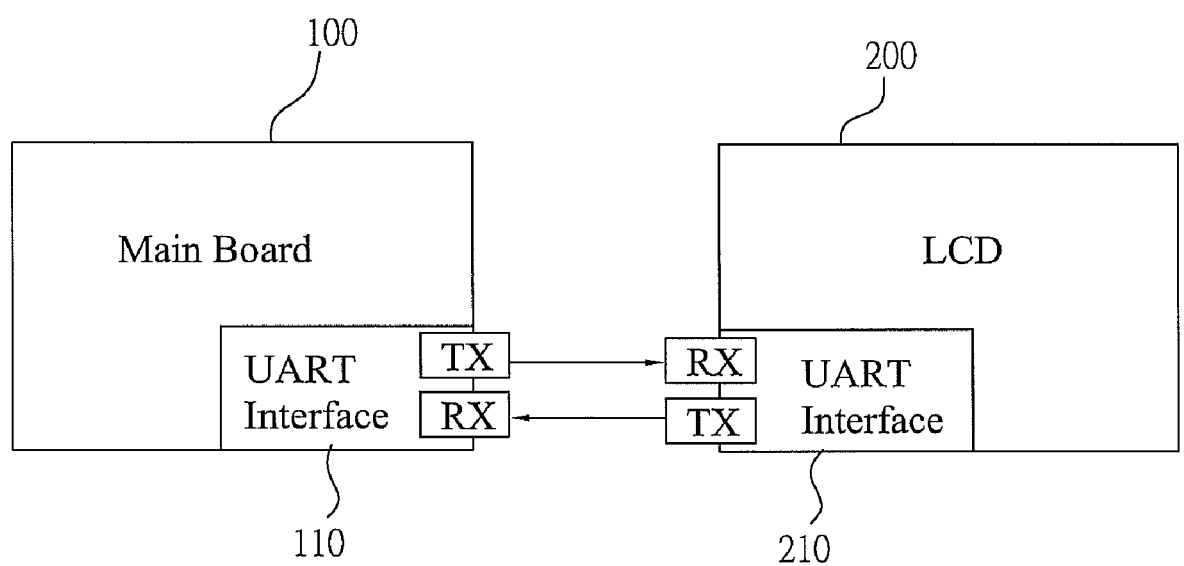
FIG. 2 is a block diagram showing a scanner connected with a Liquid Crystal Display.
Figure 3:
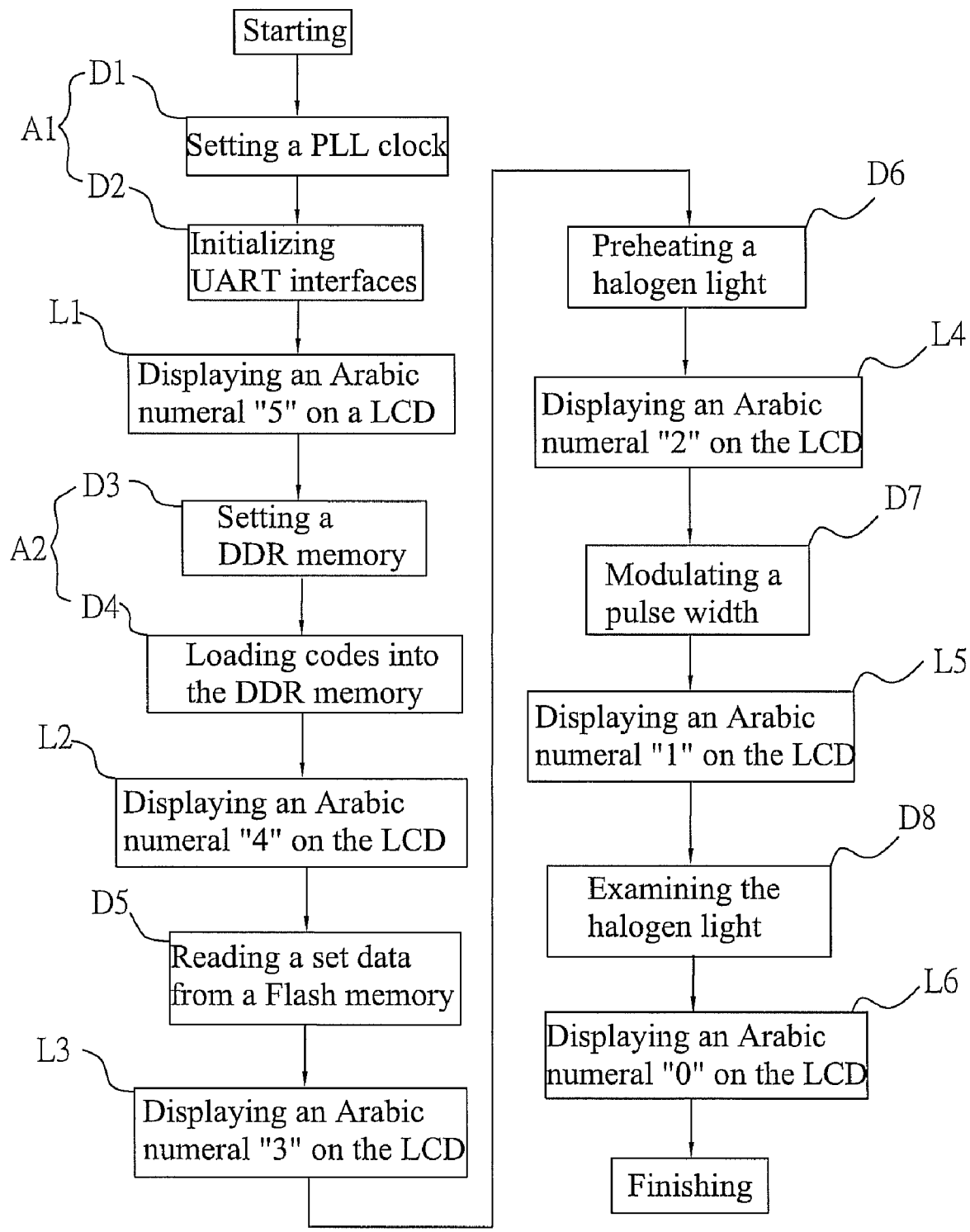
FIG. 3 is a block diagram showing the method for displaying the starting process of the scanner in detail.

Referring to FIGS. 2-3, an unlimited embodiment is introduced for describing the above-mentioned method. In the unlimited embodiment, the electronic device is a scanner and the displaying device is a Liquid Crystal Display (LCD) 200. A first Universal Asynchronous Receiver/Transmitter (UART) interface 110 of a main board 100 of the scanner is connected with a second UART interface 210 of the LCD 200. The method for displaying the starting process of the scanner is described hereinafter. Firstly, the starting process of the scanner is divided according to a run-order into a first starting stage A1 comprising of a first sub-stage D1 and a second sub-stage D2, a second starting stage A2 comprising of a third sub-stage D3 and a fourth sub-stage D4, a third starting stage D5, a fourth starting stage D6, a fifth starting stage D7 and a sixth starting stage D8. Next, the displaying data for each of the starting stages is set respectively, wherein the displaying data is a series of Arabic numerals having a reverse order. Lastly, after executing each of the starting stages, the corresponding Arabic numeral is transmitted to the LCD 200 and then displayed on the LCD 200.

Referring to FIG. 3 again, the method for displaying the starting process of the scanner is in detail described as following.

Step 1, the scanner executes the first starting stage A1. In the first starting stage A1, the first sub-stage D1 is executed to set a Phase Locked Loop (PLL) clock so as to generate a steady frequency signal for the scanner, and then the second sub-stage D2 is executed to initialize the UART interfaces 110, 210.

Step 2, after executing the first starting stage A1, the scanner executes a first displaying stage L1, namely transmitting an Arabic numeral "5" to the LCD 200 and displaying the Arabic numeral "5" on the LCD 200 so as to indicate that the first starting stage A1 is finished.

Step 3, the scanner executes the second starting stage A2. In the second starting stage A2, the third sub-stage D3 is executed to set a Dual Date Rate (DDR) memory, and then the fourth sub-stage D4 is executed to load program codes from a Flash memory of the scanner into the DDR memory and finally the program codes are executed.

Step 4, after executing the second starting stage A2, the scanner executes a second displaying stage L2, namely transmitting an Arabic numeral "4" to the LCD 200 and displaying the Arabic numeral "4" on the LCD 200 so as to indicate that the second starting stage A2 is finished.

Step 5, the scanner executes the third starting stage D5, namely reading a set data from the Flash memory so as to initialize the Flash memory.

Step 6, after executing the third starting stage D5, the scanner executes a third displaying stage L3, namely transmitting an Arabic numeral "3" to the LCD 200 and displaying the Arabic numeral "3" on the LCD 200 so as to indicate that the third starting stage D5 is finished.

Step 7, the scanner executes the fourth starting stage D6, namely preheating a halogen light, wherein a heating circuit disposed in the scanner is started to preheat the halogen light.

Step 8, after executing the fourth starting stage D6, the scanner executes a fourth displaying stage L4, namely transmitting an Arabic numeral "2" to the LCD 200 and displaying the Arabic numeral "2" on the LCD 200 so as to indicate that the fourth starting stage D6 is finished.

Step 9, the scanner executes the fifth starting stage D7, namely modulating a pulse width so as to regulate a brightness of the halogen light.

Step 10, after executing the fifth starting stage D7, the scanner executes a fifth displaying stage L5, namely transmitting an Arabic numeral "1" to the LCD 200 and displaying the Arabic numeral "1" on the LCD 200 so as to indicate that the fifth starting stage D7 is finished.

Step 11, the scanner executes the sixth starting stage D8, namely the scanner determines whether or nor the halogen light is ready for use.

Step 12, after executing the sixth starting stage D8, if it is determined in Step 11 that the halogen light is ready to be used, the scanner executes a sixth displaying stage L6, namely transmitting an Arabic numeral "0" to the LCD 200 and displaying the Arabic numeral "0" on the LCD 200 so as to indicate that the sixth starting stage D8 is finished. The Arabic numeral "0" is displayed on the LCD 200 that further indicates that the starting process of the scanner is finished and the scanner is ready to work.

When the scanner fails in the starting process thereof, the reason for the failure can be preliminarily ascertained by viewing for example by an operator the Arabic numerals displayed on the LCD 200. For example, if the Arabic numeral "3" is displayed on the LCD 200 at all times, the reason for the failure can be preliminarily estimated in the fourth starting stage D6, in other words, preheating the halogen light may fail.

As described above, the method for displaying the starting process of the electronic device according to the present invention can make the starting process of the electronic device more intuitionistic by way of dividing the starting process into several starting stages and then displaying the displaying data corresponding to each of the starting stages on the displaying device. Furthermore, when the electronic device fails in the starting process thereof, the reason for the failure is easy to be preliminarily found via the displaying data displayed on the displaying device so as to provide a helpful reference to the trouble clearing.

The foregoing description of the present invention has been presented for purposes of illustration and description. It is not intended to be exhaustive or to limit the invention to the precise form disclosed, and obviously many modifications and variations are possible in light of the above teaching. For example, the electronic device can be a printer, the displaying device can be a loudspeaker and the displaying data can be different audio and/or video signals and so on. The starting process can also be divided into certain number of sub-processes according to a function. Such modifications and variations that may be apparent to those skilled in the art are intended to be included within the scope of this invention as defined by the accompanying claims.

What is claimed is:

1. A method adapted for displaying a starting process of an electronic device, comprising the steps of:
    dividing the starting process of the electronic device into a plurality of starting stages;
    setting a displaying data for each of the starting stages respectively; and
    transmitting the corresponding displaying data to a displaying device and displaying the displaying data on the displaying device after executing each of the starting stages.

2. The method as claimed in claim 1, wherein the displaying device is connected with the electronic device by way of universal asynchronous receiver/transmitter interfaces.

3. The method as claimed in claim 1, wherein the starting process is divided according to a run-order or a function into the starting stages.

4. The method as claimed in claim 1, wherein the displaying device is a display or a loudspeaker.

5. The method as claimed in claim 1, wherein the displaying data is an Arabic numeral or an audio signal.

* * * * *